(12) United States Patent
Chari et al.

(10) Patent No.: US 10,394,591 B2
(45) Date of Patent: Aug. 27, 2019

(54) SANITIZING VIRTUALIZED COMPOSITE SERVICES

(71) Applicant: International Business Machines Corporation, Armonk, NY (US)

(72) Inventors: Suresh N. Chari, Tarrytown, NY (US); Ashish Kundu, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 15/407,382

(22) Filed: Jan. 17, 2017

(65) Prior Publication Data
US 2018/0203890 A1   Jul. 19, 2018

(51) Int. Cl.
G06F 17/30 (2006.01)
G06F 9/455 (2018.01)
H04L 29/08 (2006.01)
G06F 8/61 (2018.01)

(52) U.S. Cl.
CPC ...... *G06F 9/45558* (2013.01); *G06F 9/45512* (2013.01); *G06F 8/63* (2013.01); *G06F 2009/4557* (2013.01); *G06F 2009/45562* (2013.01); *G06F 2009/45575* (2013.01); *G06F 2009/45591* (2013.01); *H04L 67/10* (2013.01)

(58) Field of Classification Search
CPC ......... G06F 17/30067; G06F 17/30082; G06F 9/45533; G06F 9/45537; G06F 9/45558; G06F 9/507; G06F 2009/45591; G06F 2009/45595; G06F 2009/4557; G06F 21/60; G06F 9/45512; G06F 2009/45575; G06F 2009/45562; G06F 8/63; H04L 67/10; G06Q 10/10
See application file for complete search history.

(56) References Cited

U.S. PATENT DOCUMENTS

| 6,002,409 | A | 12/1999 | Harkin | |
|---|---|---|---|---|
| 8,011,010 | B2 | 8/2011 | Michael et al. | |
| 8,156,516 | B2 * | 4/2012 | McClain | G06F 21/604 |
| | | | | 725/1 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Greta L Robinson
(74) *Attorney, Agent, or Firm* — Law Office of Jim Boice

(57) ABSTRACT

A method sanitizes a virtualized composite service. One or more processors provide a sanitization policy for each image within the virtualized composite service. The processor(s) analyze sanitization policies for multiple images in the virtualized composite service in order to detect inconsistencies among the sanitization policies. The processor(s), in response to finding inconsistencies between the sanitization policies, resolve the inconsistencies to produce a consistent sanitization policy, and then use the consistent sanitization policy to sanitize the virtualized composite service to create a sanitized virtualized composite service. The processor(s) receive a request for the virtualized composite service from a requester, and then respond to the request for the virtualized composite service by returning the sanitized virtualized composite service to the requester.

17 Claims, 7 Drawing Sheets

(56) References Cited

U.S. PATENT DOCUMENTS

| | | | |
|---|---|---|---|
| 8,654,050 B2 | 2/2014 | Ueki et al. | |
| 8,954,050 B2 | 2/2015 | Deasy et al. | |
| 8,954,760 B2 | 2/2015 | Kundu et al. | |
| 2004/0111639 A1* | 6/2004 | Schwartz | H04L 63/0245 726/1 |
| 2007/0067373 A1* | 3/2007 | Higgins | G06F 11/3013 |
| 2007/0234337 A1 | 10/2007 | Suzuki et al. | |
| 2009/0228587 A1 | 9/2009 | Chagoly | |
| 2009/0235358 A1 | 9/2009 | Tolba | |
| 2012/0084769 A1 | 4/2012 | Adi et al. | |
| 2012/0084830 A1* | 4/2012 | Dekok | H04L 41/0631 726/1 |
| 2012/0167209 A1 | 6/2012 | Molnar et al. | |
| 2013/0031595 A1 | 1/2013 | Nevstruev et al. | |
| 2013/0167192 A1 | 6/2013 | Hickman et al. | |
| 2013/0179968 A1* | 7/2013 | Ciocarlie | G06N 99/005 726/22 |
| 2013/0198818 A1 | 8/2013 | Piliouras | |
| 2014/0181998 A1* | 6/2014 | Hunt | H04W 12/08 726/30 |
| 2014/0283089 A1 | 9/2014 | Arya | |
| 2014/0324789 A1* | 10/2014 | Saner | G06F 17/3095 707/692 |
| 2015/0033221 A1* | 1/2015 | Chari | H04L 63/105 718/1 |
| 2015/0033223 A1 | 1/2015 | Chari et al. | |
| 2015/0278531 A1* | 10/2015 | Smith | G06F 21/6218 713/165 |
| 2016/0210461 A1 | 7/2016 | Chari et al. | |
| 2016/0210462 A1 | 7/2016 | Chari et al. | |

OTHER PUBLICATIONS

List of IBM Patents or Patent Applications Treated as Related, Jan. 17, 2017, pp. 1-2.

U.S. Appl. No. 13/950,014—Non-Final Office Action dated Jul. 6, 2015, pp. 1-23.

U.S. Appl. No. 13/950,014—Non-Final Office Action dated Nov. 4, 2015, pp. 1-16.

Gutmann, "Secure Deletion of Data From Magnetic and Solid-State Memory", Proceedings of the Sixth USENIX Security Symposium, Jul. 1996, pp. 1-18.

Gutmann, "Data Remanence in Semiconductor Devices", Proceedings of the 10th USENIX Security Symposium, Aug. 2001, pp. 1-19.

Halderman et al., "Lest We Remember: Cold Boot Attacks on Encryption Keys", Proceedings of the 17th USENIX Security Symposium, Jul. 2008, pp. 1-16.

Samyde et al., "On a New Way to Read Data From Memory", Proceedings of the First International IEEE Security in Storage Workshop, Dec. 2002, pp. 65-69.

Skorobogatov, "Data Remanence in Flash Memory Devices", Cryptographic Hardware and Embedded Systems—CHES 2005, Lecture Notes in Computer Science vol. 3659, Sep. 2005, pp. 339-353.

Skorobogatov, "Low Temperature Data Remanence in Static RAM", University of Cambridge Computer Laboratory Technical Report No. 536. Jun. 2002, pp. 1-9.

\* cited by examiner

SANITIZING VIRTUALIZED COMPOSITE SERVICES

BACKGROUND

The present invention relates to the field of computers, and particularly to computers that provide virtualized composite services, including but not limited to supplying virtual machines to requesters. Still more particularly, the present invention relates to sanitizing virtualized composite services.

SUMMARY

In one or more embodiments of the present invention, a method sanitizes a virtualized composite service. One or more processors provide a sanitization policy for each image within the virtualized composite service. The processor(s) analyze sanitization policies for multiple images in the virtualized composite service in order to detect inconsistencies among the sanitization policies. The processor(s), in response to finding inconsistencies between the sanitization policies, resolve the inconsistencies to produce a consistent sanitization policy, and then use the consistent sanitization policy to sanitize the virtualized composite service to create a sanitized virtualized composite service. The processor(s) receive a request for the virtualized composite service from a requester, and then respond to the request for the virtualized composite service by returning the sanitized virtualized composite service to the requester.

The described invention may also be implemented in a computer system and/or as a computer program product.

DETAILED DESCRIPTION

Figure 1:
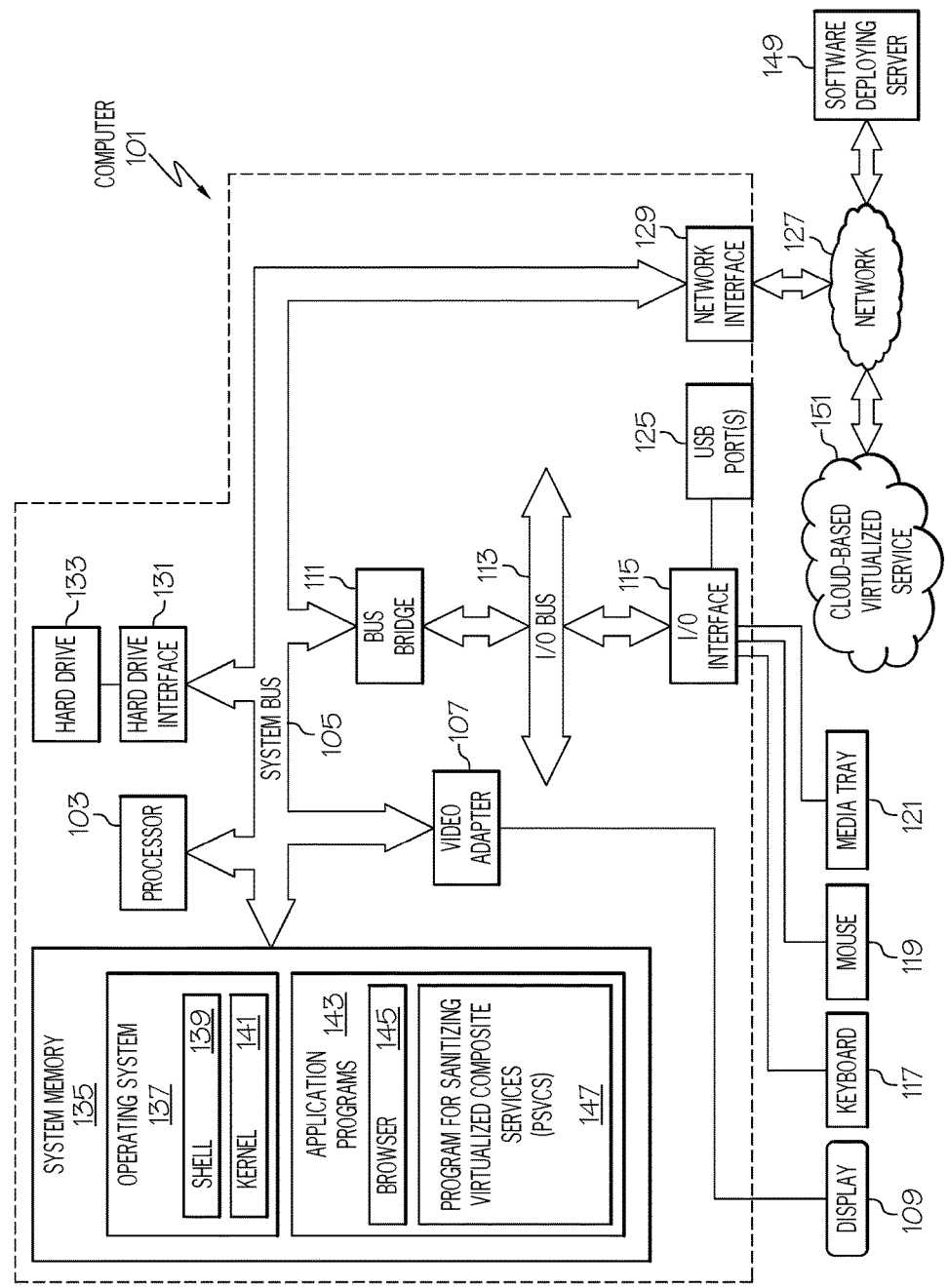
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or computer 201 and/or servers 206a-206n and/or VM image manager 208 shown in FIG. 2.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems, such as systems that support the depicted cloud-based virtualized service 151, using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Sanitizing Virtualized Composite Services (PSVCS) 147. PSVCS 147 includes code for implementing the processes described below, including those described in FIGS. 2-6. In one embodiment, computer 101 is able to download PSVCS 147 from software deploying server 149, including in an on-demand basis, wherein the code in PSVCS 147 is not downloaded until needed for execution. In one embodiment of the present invention, software deploying server 149 performs all of the functions associated with the present invention (including execution of PSVCS 147), thus freeing computer 101 from having to use its own internal computing resources to execute PSVCS 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Virtualized composite services are services that employ multiple virtual machine (VM) instances specific to a workflow topology. The service instance (composition of VM instances) is constructed out of multiple images, image templates, and/or pre-configuration data. The configuration, topology and meta-data required for creation of a service consists of instances created out of these images and integrated to provide the required functionality.

Figure 2:
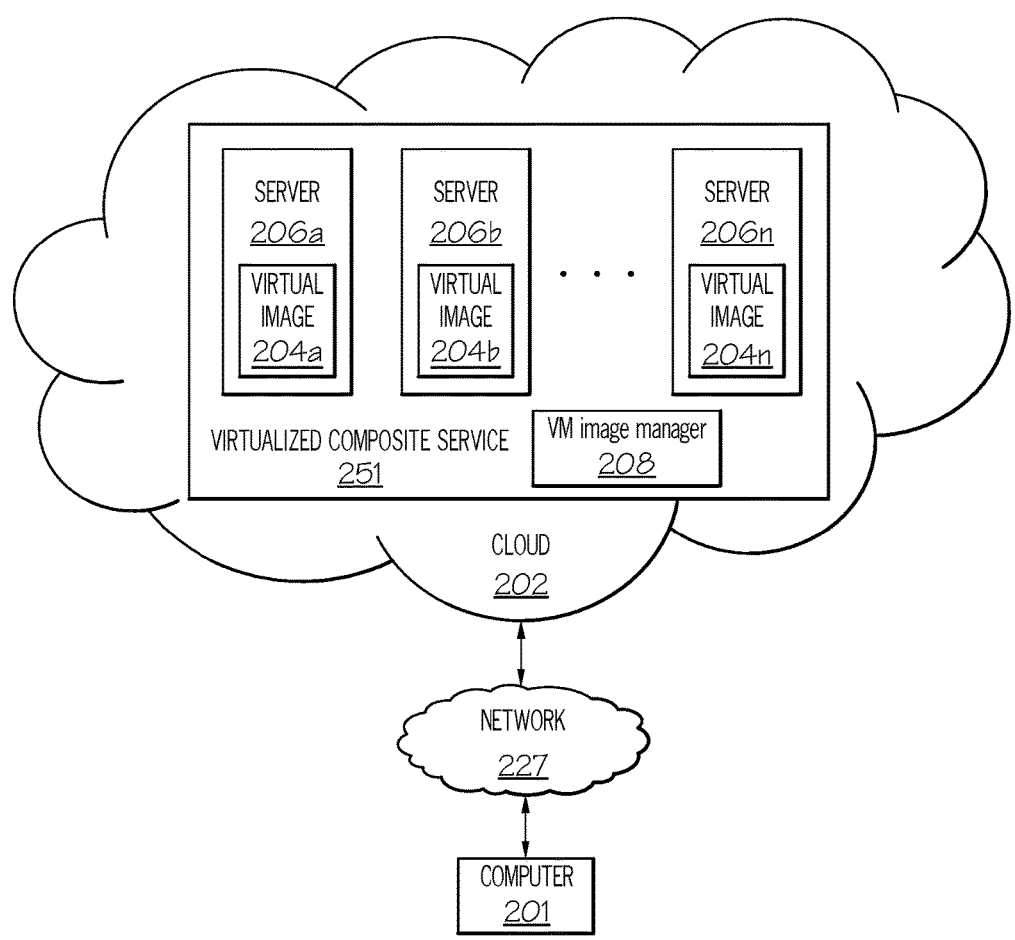
FIG. 2 illustrates an exemplary virtualized composite service as utilized in one or more embodiments of the present invention.

With reference now to FIG. 2, consider an exemplary virtualized composite service 251 (analogous to the cloud-based virtualized service 151 shown in FIG. 1) as utilized in one or more embodiments of the present invention.

A computer 201 (analogous to computer 101 shown in FIG. 1) uses a network 227 (analogous to network 127 shown in FIG. 1) to communicate with a cloud 202 of resources. Cloud 202 provides shared computer processing resources and data to computer 201 on demand, and includes a shared pool of configurable computing resources (e.g., computer networks, servers, storage, applications and services), including the depicted virtualized composite service 251.

In an exemplary embodiment of the present invention, virtualized composite service 251 includes multiple virtual images 204a-204n (where "n" is an integer) running on one or more servers, including the depicted servers 206a-206n. While each of the virtual images 204a-204n is depicted running on a separate server from servers 206a-206n, it is understood that more than one of the virtual images 204a-204n may be hosted (run on) just one of the servers 206a-206n.

In one or more embodiments of the present invention in which virtual images 204a-204n are virtual machines (VM), the virtual images 204a-204n are under the control of a VM image manager 208, which coordinates the sanitization of the virtual images 204a-204n as described herein.

Virtual images 204a-204n are virtual resources, such as virtual machines (e.g., software programs that emulate and function as a computer), instances of virtual resources (e.g., software programs that emulate storage devices, etc.), etc. Each of the virtual images 204a-204n may contain sensitive data, which needs to be sanitized (e.g., removed, encrypted, etc.). However, the different virtual images 204a-204b and/ or the different servers 206a-206n may have different policies regarding how (or even if) such sensitive data is sanitized. This will cause a problem, since the different policies will apply different actions to the images/servers, such that there is no consistent sanitization across all of the virtualized composite service 251.

Thus, the present invention sanitizes the composite image (e.g., the virtualized composite service 251) so that the policies of sanitization are consistent across each other. For example, an instance such as virtual image 204a may host a database program such as DB2, while and another instance such as virtual image 204b may host a web application server, which needs to know the username and password used by the virtual image 204a in order to access DB2. If independent sanitization policies are applied to the virtual images 204a-204b (instances), then the DB2 instance (running on virtual image 204a) may have a password that is different than the password specified in the web application server running on virtual image 204b.

That is, if the sanitization method for individual images is used in a manner independent of other images, then this may lead to data disclosure and sanitization inconsistent with the overall security policies, and thus may lead to confidentiality and privacy breaches as well as intrusion. Therefore, the present invention sanitizes a composite VM image (e.g., virtualized composite service 251) in a manner that is consistent with the overall security policies for all of the virtual resources (e.g., virtual images 204a-204n) in the virtualized composite service 251.

In order to sanitize a virtual machine or other virtual resource, one or more embodiments of the present invention utilize a labeler and a sanitizer to sanitize a virtual resource (i.e., remove, encrypt, or otherwise prevent sensitive data from being released from a virtual resource). That is, the labeler 300 and sanitizer 400 described below in FIG. 3 and FIG. 4 respectively reside in each of the virtual images 204a-204n shown in FIG. 2. As described in detail below, any inconsistencies in these labelers/sanitizers 300/400 are resolved to create a sanitized virtualized composite service from the virtualized composite service 251 shown in FIG. 2.

Figure 3:
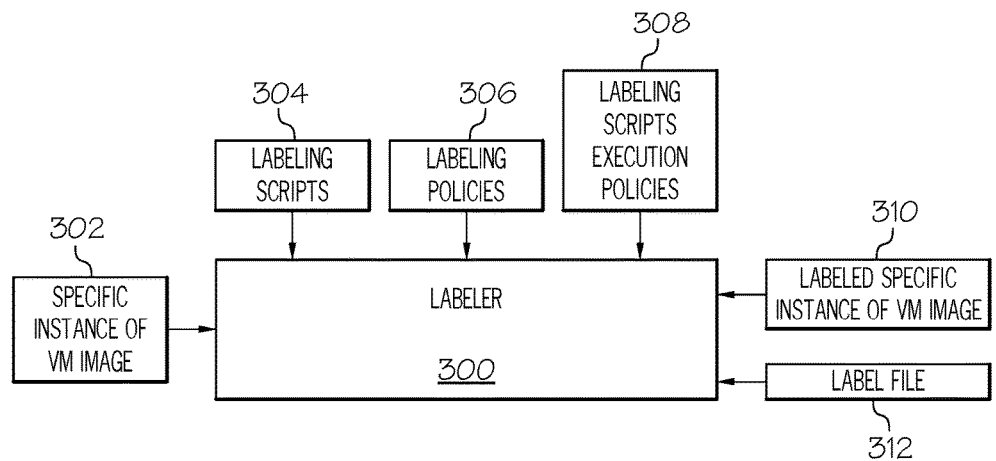
FIG. 3 depicts an exemplary labeler used to label sensitive data contained within a virtual image within the virtualized composite service depicted in FIG. 2.

With reference now to FIG. 3, a diagram illustrating a labeler is depicted in accordance with an illustrative embodiment of the present invention. Labeler 300 labels sensitive data contained within one or more software components of a software stack installed on a virtual machine image (e.g., one or more of the virtual images 204a-204n shown in FIG. 2), such as the specific instance of VM image 302 shown in FIG. 3.

Labeler 300 includes labeling scripts 304, labeling policies 306, and labeling script execution policies 308. Labeling scripts 304 may include a list of paths to and/or locations of sensitive data contained within each software component of the software stack in specific instance of virtual machine image 302. Labeling scripts 304 define types of sensitive data using, for example, an extensible markup language. As a result, labeling scripts 304 are able to discover installation paths, files, and presence or absence of particular sensitive data items within, for example, data caches or system logs. Further, labeling scripts 304 generate an appropriate sensitivity level label for each identified sensitive data item and each path to the locations of the identified sensitive data items when applied to specific software components of the software stack in specific instance of virtual machine image 302.

Labeling policies 306 define the particular sensitivity levels associated with each type of sensitive data item. For example, labeling policies 306 may define a password data item as having a high sensitivity level, whereas a system log data item may have a medium sensitivity level. Labeling policies 306 may define the particular sensitivity levels associated with each type of sensitive data item using, for example, extensible markup language or comma-separated values.

For each particular software component of the software stack installed on specific instance of virtual machine image 302, at least one labeling script exists for that particular software component. Labeling scripts 304 are executable code that are executed for a particular virtual machine image or instance based on specified labeling script execution policies, such as labeling script execution policies 308. Labeling script execution policies 308 specify an order of execution for labeling scripts 304 based on identified labeling dependencies between the software components of the software stack installed on specific instance of virtual machine image 302. The identified labeling dependencies may be represented by a directed acyclic graph, for example.

Some labeling scripts in labeling scripts 304 are executed, for example, in a specified order, which is a total dependent order of execution. For example, labeling script execution policies 308 may specify that if labeling script LS(1) fails or throws an exception, then labeling script execution policies 308 specify that the execution of labeling script LS(2) is to be aborted. In other words, the labeling script execution policy of <LS(1),LS(2)> is a total dependent order of execution policy. In contrast, some labeling scripts may be executed in any order, which is a partial dependent order of execution.

Each labeling script in labeling scripts 304 determines a location of each particular data item type, determines whether each particular data item type and corresponding values need to be labeled, and, if labeled, which sensitivity level label is to be applied to that particular data item type. Labeling scripts 304 embed the sensitivity level labels in specific instance of virtual machine image 302 by attaching the labels to the sensitive data items and updating specific instance of virtual machine image 302 to form labeled specific instance of virtual image 310. Alternatively, labeling scripts 304 may utilize, for example, a label file, such as label file 312, to store the associations between each particular identified sensitive data item and its respective sensitivity level label. A virtual machine image manager, such as virtual machine image manager 208 in FIG. 2, may provide labeled specific instance of virtual image 310 and/or label file 312 to a sanitizer at a later point in time so that the sanitizer can identify the labeled sensitive data items and sanitize them. The sanitizer may be, for example, sanitizer 400 shown below in FIG. 4.

Labeler 300 executes labeling scripts 304 for the operating system in the order specified by labeling script execution policies 308. Based on the order of execution, labeler 300 executes labeling script LS(j) if the conditions in labeling script execution policies 308 evaluate to true for labeling script LS(j). For example, in one embodiment an ordering condition AND a failure condition are true for labeling script LS(j). The ordering condition is true for labeling script LS(j) if all the labeling scripts LS(i), which are before labeling script LS(j) in the total dependent order of execution, have already been executed. Total dependent order of execution exists between labeling script LS(i) and labeling script LS(j) if a path from labeling script LS(i) to labeling script LS(j) exists in the directed acyclic graph of labeling dependencies. In contrast, labeling script LS(i) and labeling script LS(k) are in partial dependent order of execution if no direct path exists between LS(i) and LS (k) in the directed acyclic graph of labeling dependencies.

The failure condition is true for labeling script LS(j) if all the labeling scripts LS(i), which precede labeling script LS(j) in total dependent order of execution, have been successfully executed. In other words, no failure or exception is raised during execution of labeling scripts LS(i). The failure condition also is true for labeling script LS(j) if labeling scripts LS(i+m) to LS(i+n), which precede labeling script LS(j) in total dependent order of execution, failed to execute or led to an exception AND labeling script execution policies 308 specify directly or indirectly that execution of labeling script LS(j) can proceed in the event of such failures or exceptions. It should be noted that "m" is greater than or equal to "n" above.

Figure 4:
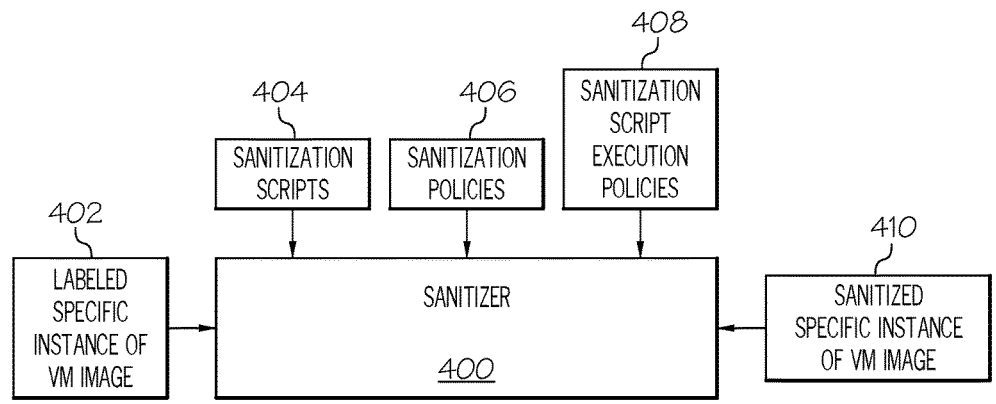
FIG. 4 illustrates an exemplary sanitizer for sanitizing labeled sensitive data contained within a virtual image within the virtualized composite service depicted in FIG. 2.

With reference now to FIG. 4, a diagram illustrating a sanitizer 400 is depicted in accordance with an illustrative embodiment. Sanitizer 400 sanitizes sensitive data contained within one or more software components of a software stack installed in a labeled virtual machine image, such as labeled specific instance of virtual machine image 402.

Sanitizer 400 includes sanitization scripts 404, sanitization policies 406, and sanitization script execution policies 408. Sanitization scripts 404 may be developed in programming languages such as Perl script, Python script, shell script, or any other programming language. Sanitization scripts 404 apply sanitization policies 406 in order to sanitize labeled sensitive data located within one or more software components of a software stack in labeled specific instance of virtual machine image 402. As a result, sanitization scripts 404 output sanitized specific instance of virtual machine image 410. In addition, sanitization scripts 404 may also update a sanitization history of sanitized specific instance of virtual machine image 410 either locally or remotely and update labeling information located in a label file, such as label file 312 in FIG. 3, associated with the specific instance of the virtual machine image. Further, sanitization scripts 404 may set the next sanitization process, event, and/or time if it is a regularly scheduled process.

Sanitization policies 406 specify sanitization action types and sanitization action details. Sanitization action types may include, for example, a delete action, an overwrite action, an encrypt action, and a backup deleted or overwritten data action. Sanitization action details may specify, for example, overwrite a particular sensitive data item type with a particular value and encrypt another particular sensitive data item type with a particular cryptographic key.

A sanitization policy in sanitization policies 406 may take the form of <sensitive data item type, associated sensitivity level label, and corresponding sanitization action type>, for example. Sanitization policies 406 also may specify time of sanitization, offline or online sanitization, events that trigger the sanitization process, and authorized credentials to initiate a sanitization process. A sanitization policy may be developed as an extension of the open virtualization format for a specific instance of virtual machine image or for a composite virtual machine image.

For each particular software component of the software stack installed on labeled specific instance of virtual machine image 402, at least one sanitization script exists for that particular software component. Sanitization scripts 404 are executable code that are executed for a particular virtual machine image or instance based on specified sanitization script execution policies, such as sanitization script execution policies 408. Sanitization script execution policies 408 specify an order of execution for sanitization scripts 404 based on identified sanitization dependencies between the software components of the software stack installed on labeled specific instance of virtual machine image 402. The identified sanitization dependencies may be represented by a directed acyclic graph, for example.

Some sanitization scripts in sanitization scripts 404 are executed in a specified order, which is a total dependent order of execution. For example, sanitization script execution policies 408 may specify that if sanitization script SS(1) fails or throws an exception, then sanitization script execution policies 408 specify that the execution of sanitization script SS(2) is to be aborted. In other words, the sanitization script execution policy of <SS(1),SS(2)> is a total dependent order of execution policy. In contrast, some sanitization scripts may be executed in any order, which is a partial dependent order of execution.

Each sanitization script in sanitization scripts 404 identifies labeled sensitive data items contained within software components of the software stack installed on labeled specific instance of virtual machine image 402. In addition, each sanitization script determines which sanitization action to perform on a labeled sensitive data item based on a corresponding sanitization policy that maps a particular sensitivity level label to a particular sanitization action for sanitizing the sensitive data item.

Sanitizer 400 executes sanitization scripts 404 for the operating system in the order specified by sanitization script execution policies 408. Based on the order of execution, sanitizer 400 executes sanitization script SS(j) if the conditions in sanitization script execution policies 408 evaluate to true for sanitization script SS(j). For example, in one embodiment an ordering condition AND a failure condition are true for sanitization script SS(j). The ordering condition is true for sanitization script SS(j) if all the sanitization scripts SS(i), which are before sanitization script SS(j) in the total dependent order of execution, have already been executed. Total dependent order of execution exists between sanitization script SS(i) and sanitization script SS(j) if a path from SS(i) to SS(j) exists in the directed acyclic graph of sanitization dependencies. In contrast, sanitization script SS(i) and sanitization script SS(k) are in partial dependent order of execution if no direct path exists between SS(i) and SS(k) in the directed acyclic graph of sanitization dependencies.

The failure condition is true for sanitization script SS(j) if all the sanitization scripts SS(i), which precede sanitization script SS(j) in total dependent order of execution, have been successfully executed. In other words, no failure or exception is raised during execution of sanitization scripts SS(i). The failure condition also is true for sanitization script SS(j) if sanitization scripts SS(i+m) to SS(i+n), which precede sanitization script SS(j) in total dependent order of execution, failed to execute or led to an exception AND sanitization script execution policies 408 specify directly or indirectly that execution of sanitization script SS(j) can proceed in the event of such failures or exceptions. It should be noted that "m" is greater than or equal to "n" above.

Figure 5:
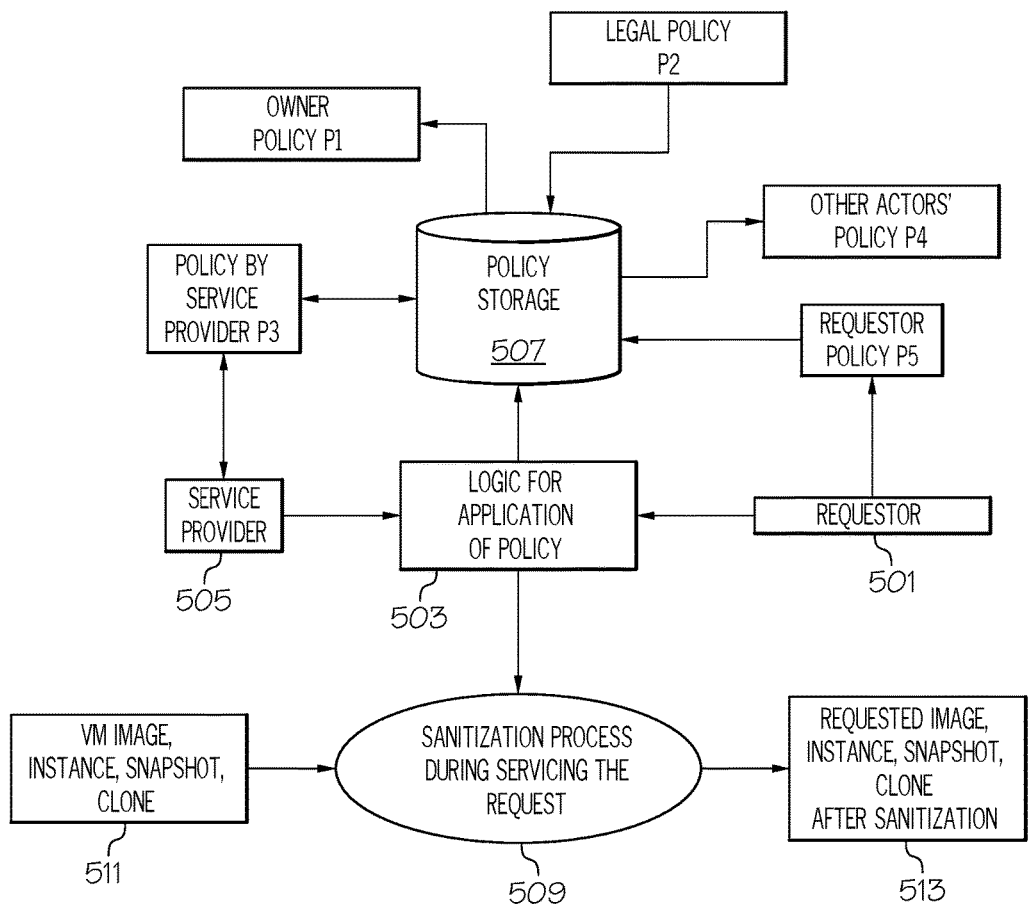
FIG. 5 depicts an application of a harmonized and consistent sanitization policy when retrieving a virtual image in accordance with one or more embodiments of the present invention.

With reference now to FIG. 5, a high-level overview of a requester receiving a requested image after the application of a harmonized and consistent sanitization policy in accordance with one or more embodiments of the present invention is presented.

Assume that a requestor 501 has requested a virtual resource such as a virtual machine image, instance, snapshot (state of a virtual machine), clone (copy of a virtual machine), etc., depicted as virtual resource 511 (e.g., one of the virtual images 204a-204n shown in FIG. 2). However, before that virtual resource 511 is returned to the requestor 501, steps need to be taken to ensure that policies that govern the sanitization process used to sanitize (e.g., remove, hide, encrypt or otherwise protect) sensitive data within the virtual resource 511 comport with other sanitization policies for other virtual resources within the virtualized composite service 251 shown in FIG. 2.

That is, VM images, instances, snapshots or clones are examples of the cloud entities. The process of sanitization may involve requirements of the requestor of an entity from another entity, or requirements of the service provider or requirements of the entity owner. Several scenarios exist requiring multiple types of policies.

For example, an image or instance may be required to be sanitized as per a policy specified by a requestor (e.g., requestor 501 shown in FIG. 5), as depicted by requester policy P5.

Alternatively and/or in addition, an image or instance may be required to be sanitized as per a policy specified by a service provider (e.g., virtualized composite service 251 shown in FIG. 2), as depicted by policy by service provider P3.

Alternatively and/or in addition, an image or instance may need to be sanitized as per a policy specified by an intermediate entity, such as an image composer (e.g., VM image manager 208 shown in FIG. 2), as depicted by other actors' policy P4.

Alternatively and/or in addition, an image or instance may need to be to be sanitized as per compliance policies such as those required under the Health Insurance Portability and Accountability Act (HIPAA), the Payment Card Industry/Data Security Standard (PCI/DSS), etc., as depicted by legal policy P2.

Alternatively and/or in addition, an image or instance may need to be sanitized as per migration policies. For example, an image or instance migrated from one data center in Europe to another data center in the US may need to adhere to the migration policies, as depicted by owner policy P1.

Alternatively and/or in addition, an image or instance may need to be sanitized according to policies on a specific interval or period.

Thus, the present invention applies policies from different virtual entities such that a combination of these policies are applied at different points in the lifetime of the image, image template or instance.

As shown in FIG. 5, one or more of these policies P1-P5 are extracted from policy storage 507 by the service provider 505, and then applied to logic for application of policy 503. That is, the logic for application of policy 503 identifies any discrepancies in policies P1-P5, harmonizes policies P1-P5 accordingly, and then sanitizes the virtual resource 511 by applying the harmonized policies P1-P5 in the sanitation process during servicing the request 509. This results in the delivery of the requested image, snapshot, clone (e.g., requested virtual resource 513) to the requestor 501 after being sanitized by the newly-harmonized sanitation policies P1-P5.

Consider now a Composite Virtual Image (CVI), which is a set of virtual images (VI) (e.g., virtual images 204a-204n shown in FIG. 2). Input to the sanitization system (e.g., sanitation process during servicing the request 509 shown in FIG. 5) is the composite image CVI, a set of scripts, a set of security and execution policies, a composite sanitization policy (CSP) and a conflict-resolution policy (CRP). Security policies include labeling and sanitization policies for each image, and an overall security policy of the composite VM image. Output is the sanitized composite VM image. In an alternate embodiment, a single composite policy may include all the policies for individual images as sub-policies.

The CSP specifies the order in which the VM images may be labeled and sanitized. The order may be a partial order.

Each actor (e.g., image owner, user requesting an instance, cloud provider, etc.) can define a policy, to specify the parts of the policies that must or should be applied. The requestor (e.g., of an instance) may select the policies or parts of the policies that are to be applied, specify the logic in which the selected policies/their parts are to be applied, and/or select the logic from one or more options provided.

Each policy specifies what to sanitize (e.g., an image, an instance from an image or other derived images, snapshots, clones, etc.).

Events and specific rules that govern sanitization for one or more events may be an event of the request of an instance of an image that is associated with certain rules.

The sanitization process applies the policies as per the logic specified. If there is no logic specified by the requestor, then the sanitation process during servicing the request 509 applies its own logic of applying the policies on the image as defined by the service provider.

In one or more embodiments, the requestor 501 selects the origin virtual entity, requests a virtual entity, specifies its policy, specifies logic for applying policies or their parts, and triggers the processing of the request.

In one or more embodiments, the service provider 505 processes the request and invokes the sanitization process one or more times. The sanitization process during servicing the request 509 invokes the logic for application of policies, which retrieves the policies from the policy storage 507.

Consider now the following exemplary sanitization process in accordance with one or more embodiments of the present invention.

Let there be a security policy for each image (i.e., SP(i) is for image i).

Then, analyze the consistency of all the SP(i) for all I (i.e., for all images). These inconsistences are identified by examining the policies and their effect on sanitization processes. If the scripts used by the policies to perform such sanitizations and/or their results are different, then the policies are deemed inconsistent.

If there is a non-empty set of inconsistencies between two or more policies, then for each inconsistency on sanitization actions (i.e., how to "clean" a data item from a virtual resource), a conflict resolution method is invoked.

For each inconsistency on labeling or data item, a conflict resolution is invoked.

Thus, the process determines if there are any inconsistencies between scripts for cleaning, such as labeling scripts and sanitization scripts. If there is any inconsistency, these conflicts are resolved by invoking a conflict resolution method. Once all inconsistencies between scripts and/or inconsistencies between policies are resolved, then the resulting cleaning method (as defined by the now consistent policies/scripts) is invoked.

That is, the cleaning method labels the VM images as per the CSP, labeling policy, sanitization policy. The VM images are sanitized as per the CSP, labeling policy, sanitization policy.

In one or more embodiments of the present invention, the conflict resolution method is based on the CRP choosing a subset of these conflicting actions such that the inconsistency is removed from this set of policies. If the CRP is not present or the conflict cannot be resolved by the CRP, then a manual process will resolve the conflicting policies.

Figure 6:
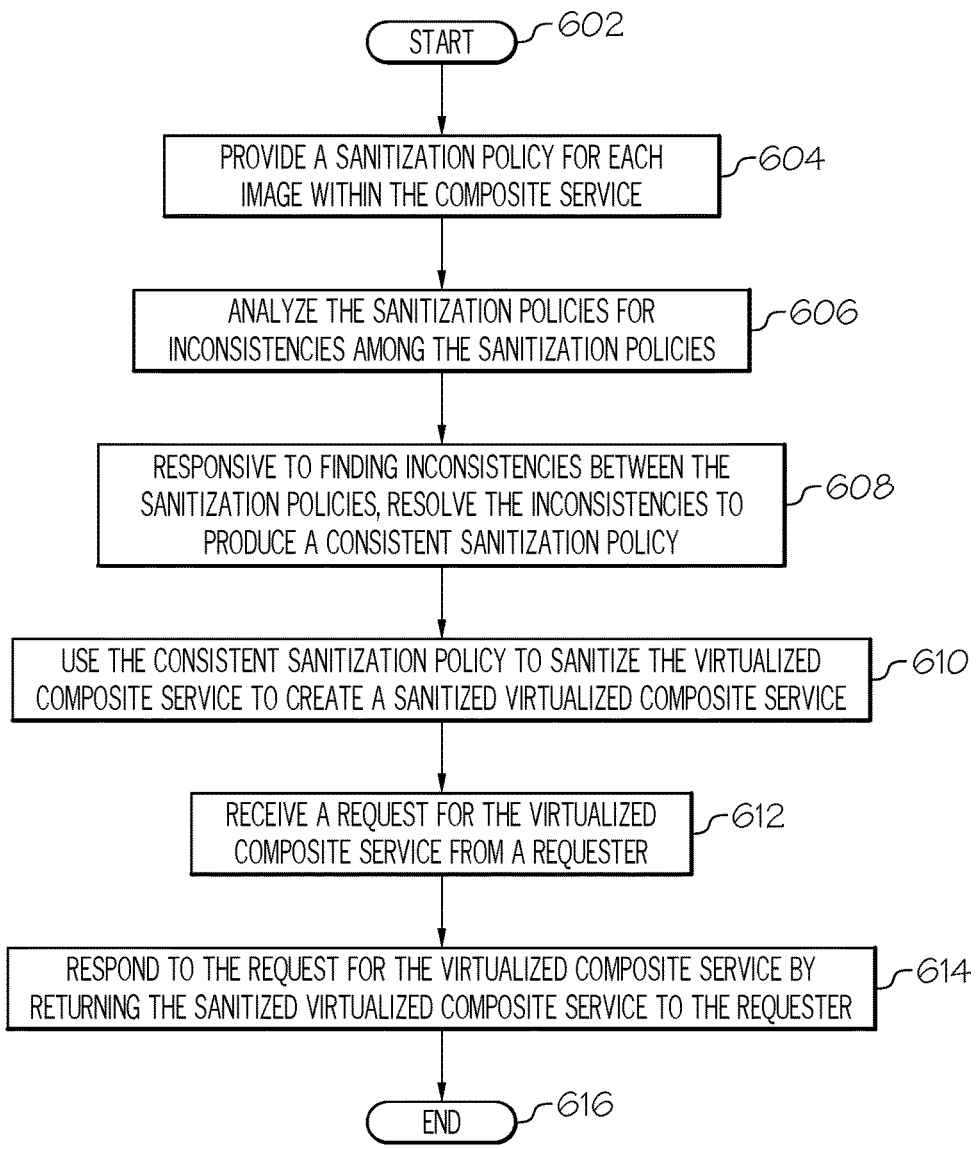
FIG. 6 is a high level flow chart of one or more steps performed by one or more processors and/or other hardware devices to sanitize a virtualized composite service in accordance with one or more embodiments of the present invention.

With reference now to FIG. 6, a high level flow chart of one or more steps performed by one or more processors and/or other hardware devices to sanitize a virtualized composite service in accordance with one or more embodiments of the present invention is presented.

After initiator block 602, one or more processors (e.g., within VM image manager 208 shown in FIG. 2) provide a sanitization policy for each image within a virtualized composite service, as described in block 604.

As described in block 606, one or more processors analyze sanitization policies for multiple images in the virtualized composite service in order to detect inconsistencies among the sanitization policies.

As described in block 608, in response to finding inconsistencies between the sanitization policies, one or more processors resolve the inconsistencies to produce a consistent sanitization policy.

As described in block 610, one or more processors then use the consistent sanitization policy to sanitize the virtualized composite service to create a sanitized virtualized composite service.

As described in block 612, one or more processors receive a request for the virtualized composite service from a requester.

As described in block 614, one or more processors then respond to the request for the virtualized composite service by returning the sanitized virtualized composite service to the requester.

The flow chart ends at terminator block 616.

In an embodiment of the present invention, one or more processors invoke, for each inconsistency between the sanitization policies, a conflict resolution method. This conflict resolution method includes: invoking, for each inconsistency on labeling of data items within the composite service, a conflict resolution for said each inconsistency on labeling of the data items; determining whether there are any inconsistencies between labeling scripts used to label sensitive data within the composite service; determining whether there are any inconsistences between sanitizing scripts used to sanitize the sensitive data within the composite service; and in response to determining that there are inconsistencies between the labeling scripts and that there are inconsistencies between the sanitizing scripts, resolving the inconsistencies between the labeling scripts and the inconsistencies between the sanitizing scripts.

In an embodiment of the present invention, the inconsistencies between the sanitization policies are resolved by a default conflict resolution policy.

In an embodiment of the present invention, the composite service (e.g., virtualized composite service 251 shown in FIG. 2) includes a set of images (e.g., virtual images 204a-204n) along with their respective set of scripts, set of security and execution policies, composite sanitization policy (CSP), and a conflict-resolution policy (CRP).

In an embodiment of the present invention, one or more processors incorporate the sanitization policy for a first image into a sanitization policy for a second image that includes a labeling policy. For example, assume that virtual image 204a has a sanitization policy but no labeling policy. In this scenario, the sanitization policy for virtual image 204a will be incorporated into the sanitization policy for virtual image 204b, due to the fact that virtual image 204b has a labeling policy (and virtual image 204a does not).

In an embodiment of the present invention, one or more processors analyze the sanitization policies for images within the composite service for inconsistences with sanitization policies for entities external to the composite service. For example, the sanitization policies for virtual resources within the cloud-based virtualized service 151 are compared to sanitization policies for computer 101 (e.g., for protecting sensitive data within hard drive 133). In response to detecting inconsistencies between the sanitization policies for images within the composite service and sanitization policies for entities external to the composite service, one or more processors modify the sanitization policies for images within the composite service to match the sanitization policies for entities external to the composite service.

In an embodiment of the present invention, the entities that are external to the composite service include a requestor, a service provider, a proxy, a data center and a compliance application, as depicted in FIG. 5.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
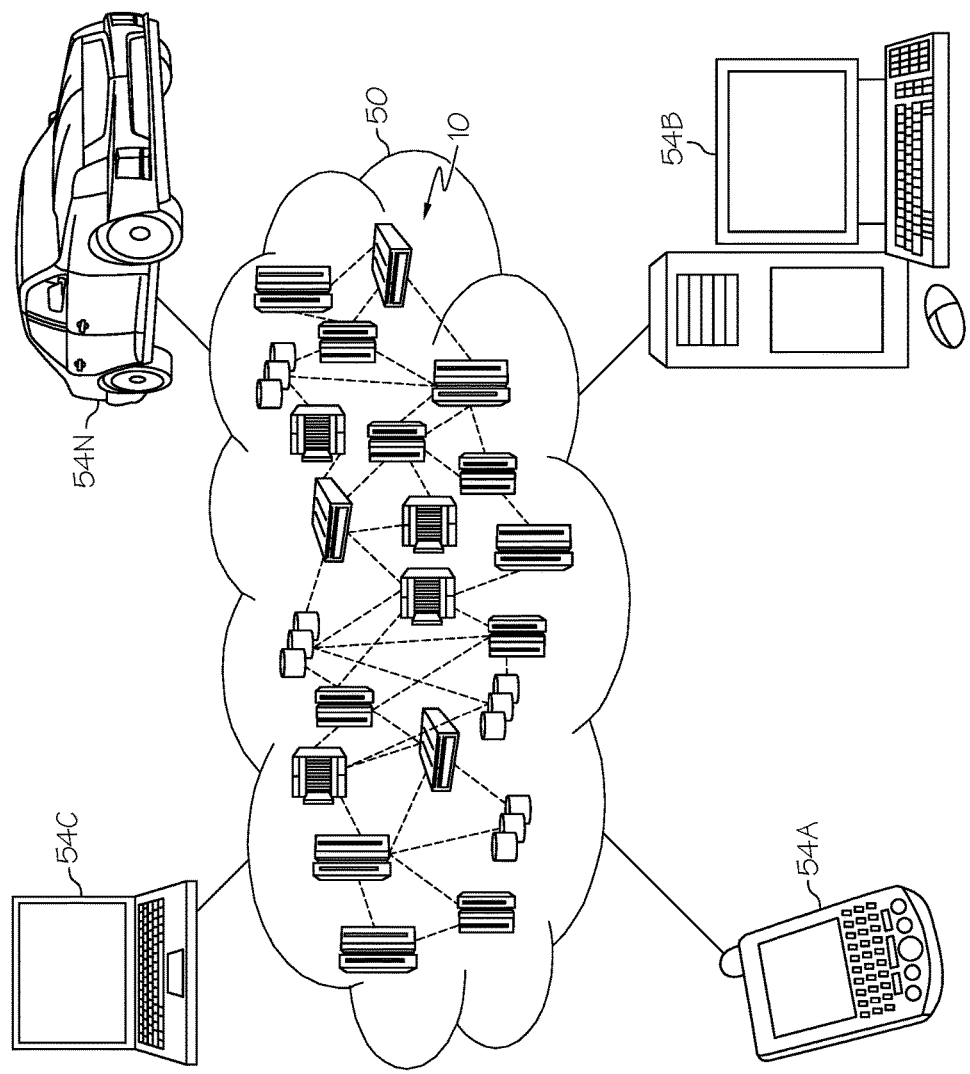
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
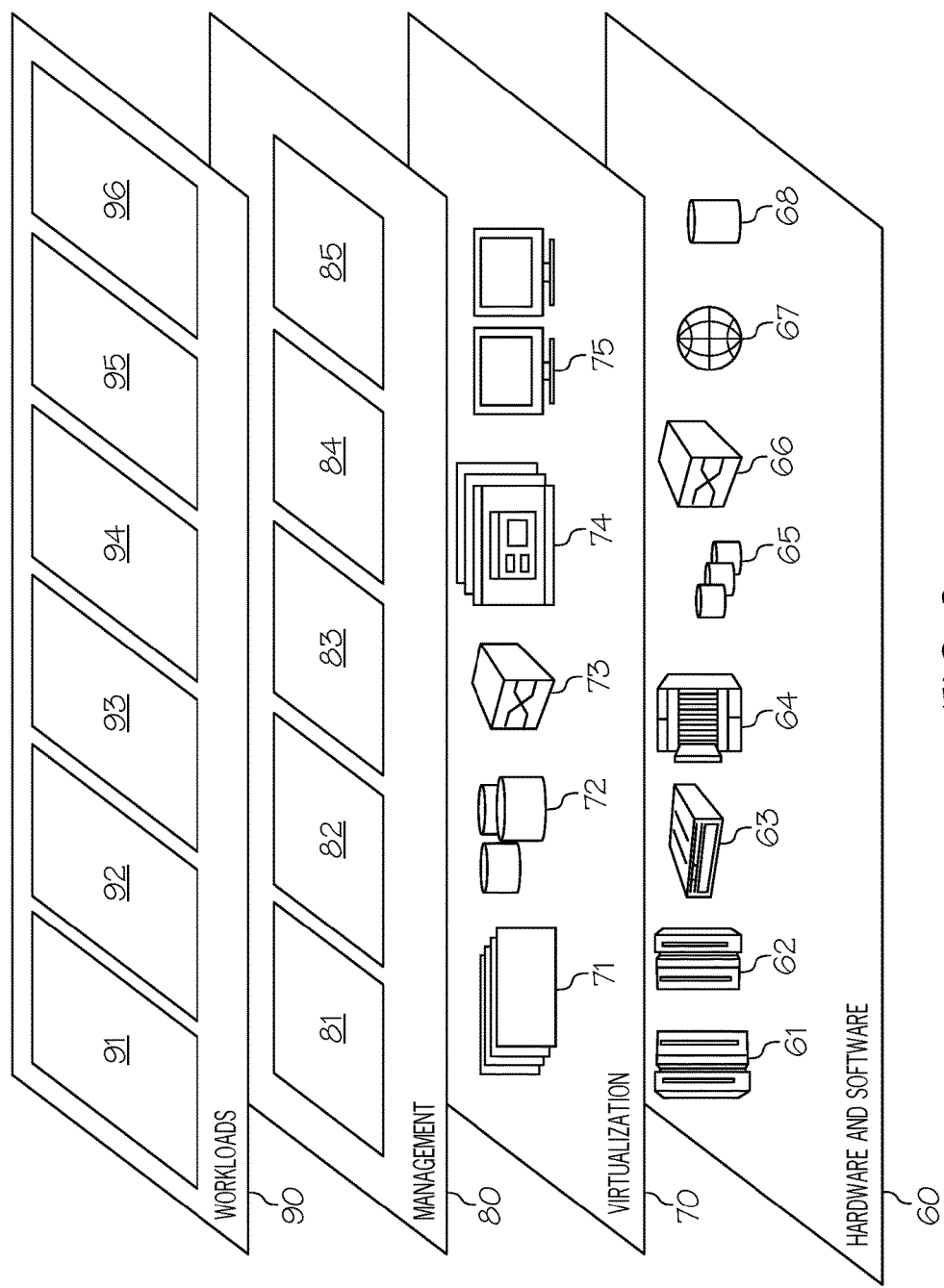
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual composite service sanitization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for sanitizing a virtualized composite service, the computer-implemented method comprising:

providing, by one or more processors, a sanitization policy for each image within a virtualized composite service, wherein the virtualized composite service employs multiple virtual machine (VM) instances that initially use different policies for sanitizing sensitive data within each VM instance;

analyzing, by one or more processors, sanitization policies for multiple images in the virtualized composite service in order to detect inconsistencies among the sanitization policies;

analyzing, by one or more processors, the sanitization policies for images within the virtualized composite service for inconsistences with sanitization policies for entities external to the virtualized composite service;

in response to detecting inconsistencies between the sanitization policies for images within the virtualized composite service and sanitization policies for entities external to the virtualized composite service, modifying, by one or more processors, the sanitization policies for images within the virtualized composite service to match the sanitization policies for entities external to the virtualized composite service;

responsive to finding inconsistencies between the sanitization policies for multiple images within the virtualized composite service, resolving, by one or more processors, the inconsistencies to produce a consistent sanitization policy;

using, by one or more processors, the consistent sanitization policy to sanitize the virtualized composite service to create a sanitized virtualized composite service;

receiving, by one or more processors, a request for the virtualized composite service from a requester; and responding, by one or more processors, to the request for the virtualized composite service by returning the sanitized virtualized composite service to the requester.

2. The computer-implemented method of claim 1, further comprising invoking, for each inconsistency between the sanitization policies, a conflict resolution method comprising:
invoking, by one or more processors and for each inconsistency on labeling of data items within the virtualized composite service, a conflict resolution for said each inconsistency on labeling of the data items;
determining, by one or more processors, whether there are any inconsistencies between labeling scripts used to label sensitive data within the virtualized composite service;
determining, by one or more processors, whether there are any inconsistences between sanitizing scripts used to sanitize the sensitive data within the virtualized composite service; and
in response to determining that there are inconsistencies between the labeling scripts and that there are inconsistencies between the sanitizing scripts, resolving, by one or more processors, the inconsistencies between the labeling scripts and the inconsistencies between the sanitizing scripts.

3. The computer-implemented method of claim 1, wherein the inconsistencies between the sanitization policies are resolved by a default conflict resolution policy.

4. The computer-implemented method of claim 1, wherein the virtualized composite service further comprises a set of images, a set of scripts, a set of security and execution policies, a composite sanitization policy (CSP), and a conflict-resolution policy (CRP).

5. The computer-implemented method of claim 1, further comprising:
incorporating, by one or more processors, the sanitization policy for a first image into a sanitization policy for a second image that includes a labeling policy.

6. The computer-implemented method of claim 1, wherein the entities external to the virtualized composite service include a requestor, a service provider, a proxy, a data center and a compliance application.

7. A computer program product for sanitizing a virtualized composite service, the computer program product comprising a computer readable storage device having program instructions embodied therewith, the program instructions readable and executable by a computer to perform a method comprising:
providing a sanitization policy for each image within a virtualized composite service, wherein the virtualized composite service employs multiple virtual machine (VM) instances that initially use different policies for sanitizing sensitive data within each VM instance;
analyzing sanitization policies for multiple images in the virtualized composite service in order to detect inconsistencies among the sanitization policies;
responsive to finding inconsistencies between the sanitization policies, resolving the inconsistencies to produce a consistent sanitization policy;
using the consistent sanitization policy to sanitize the virtualized composite service to create a sanitized virtualized composite service;
receiving a request for the virtualized composite service from a requester; and
responding to the request for the virtualized composite service by returning the sanitized virtualized composite service to the requester; wherein the method further comprises invoking, for each inconsistency between the sanitization policies, a conflict resolution method comprising:
invoking, for each inconsistency on labeling of data items within the virtualized composite service, a conflict resolution for said each inconsistency on labeling of the data items;
determining whether there are any inconsistencies between labeling scripts used to label sensitive data within the virtualized composite service;
determining whether there are any inconsistences between sanitizing scripts used to sanitize the sensitive data within the virtualized composite service; and
in response to determining that there are inconsistencies between the labeling scripts and that there are inconsistencies between the sanitizing scripts, resolving the inconsistencies between the labeling scripts and the inconsistencies between the sanitizing scripts.

8. The computer program product of claim 7, wherein the inconsistencies between the sanitization policies are resolved by a default conflict resolution policy.

9. The computer program product of claim 7, wherein the virtualized composite service further comprises a set of images, a set of scripts, a set of security and execution policies, a composite sanitization policy (CSP), and a conflict-resolution policy (CRP).

10. The computer program product of claim 7, wherein the method further comprises:
incorporating the sanitization policy for a first image into a sanitization policy for a second image that includes a labeling policy.

11. The computer program product of claim 7, wherein the method further comprises:
analyzing the sanitization policies for images within the virtualized composite service for inconsistences with sanitization policies for entities external to the virtualized composite service; and
in response to detecting inconsistencies between the sanitization policies for images within the virtualized composite service and sanitization policies for entities external to the virtualized composite service, modifying the sanitization policies for images within the virtualized composite service to match the sanitization policies for entities external to the virtualized composite service.

12. The computer program product of claim 11, wherein the entities external to the virtualized composite service include a requestor, a service provider, a proxy, a data center and a compliance application.

13. The computer program product of claim 7, wherein the program instructions are provided as a service in a cloud environment.

14. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
program instructions to provide a sanitization policy for each image within a virtualized composite service, wherein the virtualized composite service employs multiple virtual machine (VM) instances that initially use different policies for sanitizing sensitive data within each VM instance;

program instructions to analyze sanitization policies for multiple images in the virtualized composite service in order to detect inconsistencies among the sanitization policies;

program instructions to analyze sanitization policies for images within the virtualized composite service for inconsistencies with sanitization policies for entities external to the virtualized composite service;

program instructions to, in response to detecting inconsistencies between the sanitization policies for images within the virtualized composite service and sanitization policies for entities external to the virtualized composite service, modify the sanitization policies for images within the virtualized composite service to match the sanitization policies for entities external to the virtualized composite service, wherein the entities external to the virtualized composite service include a requestor, a service provider, a proxy, a data center and a compliance application;

program instructions to, responsive to finding inconsistencies between the sanitization policies for multiple images within the virtualized composite service, resolve the inconsistencies to produce a consistent sanitization policy;

program instructions to use the consistent sanitization policy to sanitize the virtualized composite service to create a sanitized virtualized composite service; and program instructions to receive a request for the virtualized composite service from a requester; and program instructions to respond to the request for the virtualized composite service by returning the sanitized virtualized composite service to the requester.

15. The computer system of claim 14, further comprising program instructions to invoke, for each inconsistency between the sanitization policies, a conflict resolution method comprising:

invoking, for each inconsistency on labeling of data items within the virtualized composite service, a conflict resolution for said each inconsistency on labeling of the data items;

determining whether there are any inconsistencies between labeling scripts used to label sensitive data within the virtualized composite service;

determining whether there are any inconsistences between sanitizing scripts used to sanitize the sensitive data within the virtualized composite service; and in response to determining that there are inconsistencies between the labeling scripts and that there are inconsistencies between the sanitizing scripts, resolving the inconsistencies between the labeling scripts and the inconsistencies between the sanitizing scripts.

16. The computer system of claim 14, wherein the inconsistencies between the sanitization policies are resolved by a default conflict resolution policy.

17. The computer system of claim 14, wherein the virtualized composite service further comprises a set of images, a set of scripts, a set of security and execution policies, a composite sanitization policy (CSP), and a conflict-resolution policy (CRP).

* * * * *